US009652264B2

(12) United States Patent
Majumdar et al.

(10) Patent No.: US 9,652,264 B2
(45) Date of Patent: May 16, 2017

(54) METHODS, SYSTEMS, AND COMPUTER READABLE MEDIA FOR PROVIDING A UNIFIED FRAMEWORK TO SUPPORT DIVERSE DATA GENERATION ENGINES

(71) Applicant: Ixia, Calabasas, CA (US)

(72) Inventors: Partha Majumdar, Woodland Hills, CA (US); Deep Datta, Kolkata (IN)

(73) Assignee: Ixia, Calabasas, CA (US)

( * ) Notice: Subject to any disclaimer, the term of this patent is extended or adjusted under 35 U.S.C. 154(b) by 620 days.

(21) Appl. No.: 13/670,450

(22) Filed: Nov. 6, 2012

(65) Prior Publication Data
US 2014/0088950 A1 Mar. 27, 2014

(30) Foreign Application Priority Data

Sep. 21, 2012 (IN) .......................... 2947/DEL/2012

(51) Int. Cl.
G06F 9/455 (2006.01)
H04L 12/26 (2006.01)
H04L 12/24 (2006.01)

(52) U.S. Cl.
CPC ............ *G06F 9/455* (2013.01); *H04L 41/022* (2013.01); *H04L 43/50* (2013.01)

(58) Field of Classification Search
None
See application file for complete search history.

(56) References Cited

U.S. PATENT DOCUMENTS

| 6,832,184 | B1 * | 12/2004 | Bleier et al. ..................... 703/23 |
| 7,313,600 | B1 * | 12/2007 | Tannous ........................ 709/217 |
| 7,342,897 | B1 * | 3/2008 | Nader et al. .................. 370/255 |
| 8,687,483 | B2 * | 4/2014 | Hutchison et al. ........... 370/229 |
| 2001/0011215 | A1 * | 8/2001 | Beeker et al. .................. 703/27 |
| 2002/0156885 | A1 * | 10/2002 | Thakkar ........................ 709/224 |
| 2003/0233637 | A1 * | 12/2003 | Martin .......................... 717/134 |
| 2004/0210798 | A1 * | 10/2004 | Higashi .......................... 714/27 |

(Continued)

OTHER PUBLICATIONS

F. Larsson and A.H. Amirkhizi, "Assessment of IxLoad in a GGSN environment," Master of Science Thesis in the Programme Networks and Distributed Systems, Chalmers University of Technology, University of Gothenburg, Department of Computer Science and Engineering, Göteborg, Sweden, Jun. 2010, 101 pages.*

(Continued)

*Primary Examiner* — Saif Alhija
(74) *Attorney, Agent, or Firm* — Jenkins, Wilson, Taylor & Hunt, P.A.

(57) ABSTRACT

Methods, systems, and computer readable media for providing a unified framework to support diverse data generation engines are provided. One exemplary system includes a protocol emulator that transmits data to a device under test. The protocol emulator sends a request including a data profile identifier to a data generation adapter. The data generation adaptor identifies a data generation engine of a plurality of data generation engines to provide data corresponding to the data profile identifier and requests the data from the identified data generation engine. The data generation engine that receives the request provides the data to the emulator, and the emulator forwards the data to the device under test.

8 Claims, 2 Drawing Sheets

(56) References Cited

U.S. PATENT DOCUMENTS

| | | | |
|---|---|---|---|
| 2005/0027503 A1* | 2/2005 | Kumar | H04L 43/50 |
| | | | 703/21 |
| 2005/0149787 A1* | 7/2005 | Choi et al. | 714/724 |
| 2005/0259594 A1* | 11/2005 | Smith | 370/254 |
| 2006/0013252 A1* | 1/2006 | Smith | 370/466 |
| 2006/0077895 A1* | 4/2006 | Wright | 370/235 |
| 2006/0140209 A1* | 6/2006 | Cassiolato et al. | 370/466 |
| 2007/0022407 A1* | 1/2007 | Givoni et al. | 717/124 |
| 2007/0180135 A1* | 8/2007 | Kenrick | H04L 29/06027 |
| | | | 709/231 |
| 2008/0059954 A1* | 3/2008 | Martin | 717/134 |
| 2009/0109063 A1* | 4/2009 | Grimshaw et al. | 340/945 |
| 2009/0125290 A1* | 5/2009 | Chatterjee et al. | 703/13 |
| 2009/0271171 A1* | 10/2009 | Nakayama et al. | 703/23 |
| 2009/0324228 A1* | 12/2009 | Bernard et al. | 398/79 |
| 2011/0256863 A1* | 10/2011 | Ramasamy et al. | 455/424 |
| 2011/0261698 A1* | 10/2011 | Kamerkar et al. | 370/235 |
| 2012/0051259 A1* | 3/2012 | Gintis et al. | 370/253 |
| 2012/0054828 A1* | 3/2012 | Jiang et al. | 726/3 |
| 2012/0150521 A1* | 6/2012 | Balkwill | 703/13 |

OTHER PUBLICATIONS

F. Larsson and A.H. Amirkhizi, "Assessment of IxLoad in a GGSN environment," Master of Science Thesis in the Programme Networks and Distributed Systems, Chalmers University of Technology, University of Gothenburg, Department of Computer Science and Engineering, G6teborg, Sweden, Jun. 2010, 101 pages.*

"IxLoad: Overview," http://www.ixiacom.com/products/network_test/applications/ixload/index.php, p. 1 (Publication Date Unknown) (Downloaded from the Internet Dec. 18, 2012).

\* cited by examiner

METHODS, SYSTEMS, AND COMPUTER READABLE MEDIA FOR PROVIDING A UNIFIED FRAMEWORK TO SUPPORT DIVERSE DATA GENERATION ENGINES

PRIORITY CLAIM

This application claims the benefit of Indian Patent Application No. 2947/DEL/2012, filed Sep. 21, 2012; the disclosure of which is incorporated herein by reference in its entirety.

TECHNICAL FIELD

The subject matter described herein related to testing communications network devices. More particularly, the subject matter described herein relates to methods, systems, and computer readable media for providing a unified framework to support diverse data generation engines that generate test data to test network communications devices.

BACKGROUND

Data traffic flowing through today's Internet includes a varied mix of data patterns. Different forms of text traffic can be found in web pages and emails. Different forms of binary traffic that traverses the Internet includes voice video, file transfers, along with undesirable traffic, such as malware and security attacks.

There are different types of network equipment like firewalls, WAN optimizers, deep packet inspection devices that need to process part or all of this data traffic in order to optimize the traffic flow or segregate or even block some part of the traffic. In order to test and validate such equipment, it is desirable to emulate some or all these payload patterns on top of various Open System Interconnect (OSI) layer 7 protocols.

One possible approach for emulating the different payload patterns is to store the payloads in multiple data files, read the data from the data files, and send the data on top of layer 7 protocols. In such an implementation, layer 7 protocol emulators would only be required to have the capability to read data files, and some current emulators have the ability to read data files. One issue with having emulators use file read operations to access data is that some emulators are required to generate gigabits of data per second. To feed such an emulator with a mix of payloads at that rate and still ensure that the same traffic is not being sent repeatedly, a large collection of such data files and a matching amount of storage would be required. The volume of required storage may require the use of disks. However, using disks for the storage is not a good option because of slow disk read speeds. Using RAM increases the read speeds, but the volume of RAM required is prohibitively expensive.

Another possible solution to emulating a diverse traffic mix is to use algorithms to generate different patterns of data in real time and use the generated data as the payload. Yet another possible solution is to use data taken from different files to prepare a mix of data which will be very close to what flows through the Internet.

One problem with including complex data generation logic in protocol emulators would lead to redundancy and maintenance overhead. Data generators could also be implemented as software libraries from which the emulator can read. Such an approach requires code in each of the emulators to identify the current test requirement and select the proper library from which to read. In short, all of the emulators need to be aware of all the existing data generator libraries and know how to read from the libraries.

Implementing different logic for each emulator is inefficient and not scalable. For example, when a change is made to a test protocol, the emulator code for each emulator must be modified to implement such a change. Requiring code modifications to implement each protocol change is undesirable.

Accordingly, there exists a need for methods, systems, and computer readable media for providing a unified framework to support diverse data generation engines.

SUMMARY

Methods, systems, and computer readable media for providing a unified framework to support diverse data generation engines are provided. One exemplary system includes a protocol emulator that transmits data to a device under test. The protocol emulator sends a request including a data profile identifier to a data generation adapter. The data generation adaptor identifies a data generation engine of a plurality of data generation engines to provide data corresponding to the data profile identifier and requests the data from the identified data generation engine. The data generation engine that receives the request provides the data to the emulator, and the emulator forwards the data to the device under test.

The subject matter described herein for providing a unified framework to support diverse data generation engines may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
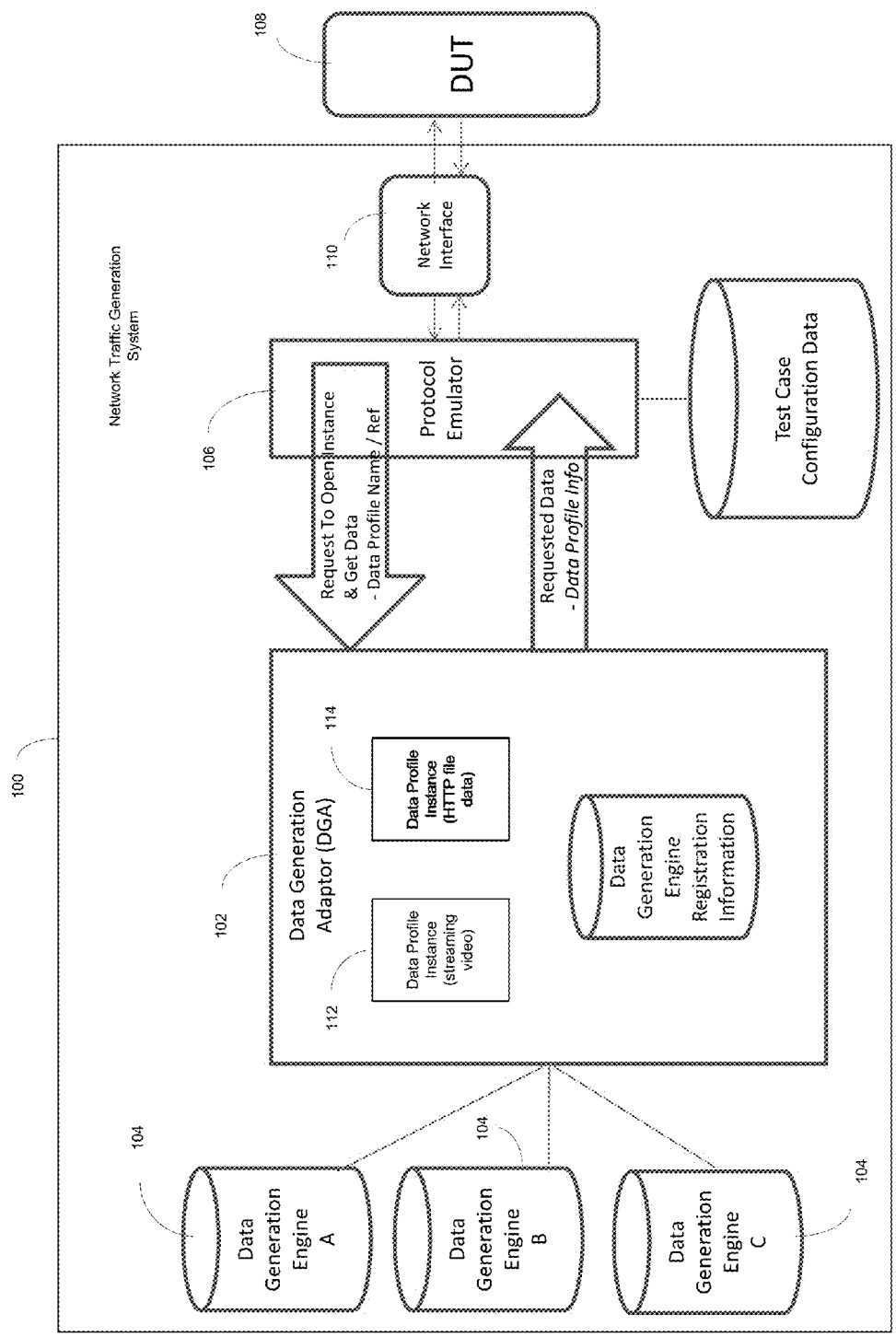
FIG. 1 is a block diagram illustrating a system for providing a unified framework to support pluggable data generation engines according to an embodiment of the subject matter described herein.

The subject matter described herein includes methods, systems, and computer readable media for providing a unified framework to support diverse data generation engines. According to one aspect of the subject matter described herein, each emulator only needs to implement a single capability, that is to read from a single data source. Such simplification of emulator design is one solution that a data generation adapter provides. The data generator based around the following basic ideas.

1. The reader, e.g., the emulator, refers to any piece of data using its name only.
2. The reader doesn't need to have any idea where a particular piece of data is stored or who is generating it.
3. The reader doesn't even need to know the numbers of different data generators that are available.
4. The reader follows 3 simple steps to use data.
   a) Open an instance to a data profile using its name.
   b) Read certain length of the data using the instance. This can be done multiple times.
   c) Close the instance when it's no longer needed.
5. The reader has access to some more features/operations, which can be used on the data reference but their behaviour may vary based on the underlying data generator.
   a) Move the read pointer to a given offset in the data stream.
   b) Read properties of the data, e.g. length, MD5 checksum.
6. All the data generators to be used need to register themselves with the data generation adapter and let the data generation adapter know the names of all the data profiles maintained by each data generator.
7. The data generators have to implement a given set of interface functions, some of which are optional. These have to be exposed to the adapter during registration.

The following terms are used to describe the present subject matter:

DGA: the acronym for data generation adapter.
Data Generation Engine: A data generator module which registers itself with the DGA in order to provide data to any reader.
Data Profile: A piece of data having a unique name, which can be provided/generated by a data generation engine.
Profile Name: A unique name given to a data profile which is used by the readers to identify a data profile.
Profile Reference: A reference to a data profile object.
Profile Instance: A instance of a data profile obtained by doing an open( ) on a profile reference. It holds any additional context that may be required for fetching further data, e.g. it may hold the offset up to which the data has already been read.

The DGA defines a fixed set of interface structure and functions that any data generator needs to implement in order to become a DGA compatible engine.

An exemplary set of parent structures that may be used to implement the subject matter described herein include:
a) Data_Generation_Engine—This structure may contain all the configurations and data structures that a data generation engine need to do its task. Each engine will create a structure derived from the parent structure defined in DGA.
b) Data_Profile—This structure may hold the profile name along with any other additional information that defines the profile. The references to this object are the profile references. It also holds a reference to its data generation engine.
c) Profile_Instance—This structure may hold any context that a data profile would need to maintain for each of its open instances. Additionally it holds a reference to its data profile.

An exemplary set of functions that may be used to implement the subject matter described herein include:
a) get_profile(Profile Name) This function takes a profile name and returns a profile reference to a data profile. The function returns an error if the profile is not present.
The profile reference is mostly used to refer to a profile rather than its name, this reduces the computational overhead of looking up names for every access.
b) Open(Profile Reference) This function creates a profile instance corresponding to a data profile referred to by the profile reference on which further data operations can be performed.
c) Get(Profile Instance, length) This function returns length bytes of data from the Profile Instance.
d) Close(Profile Instance) This function closes a profile instance, when no further operations need to be performed on this instance.
e) Seek(Profile instance, data offset) This function is optional, if this is implemented by the data generation engine, it will move the read pointer for this Profile Instance to the data offset position in the data stream. The semantic of this offset may vary for different generators.
f) Length(Profile Reference) Returns the length in bytes of the data profile referred by the profile reference.
g) GetAttribute(Profile Reference, Attribute type) Returns the value of specific attributes that may be associated with the data profile, e.g. MD5 checksum, whether the data profile can be random accessed, whether the data profile will yield the same data whenever its read, etc. The reader can choose to use this information for optimizations or caching.

In one exemplary implementation, the DGA maintains a hash table of all the available profile names along with their respective data generation engines. Whenever a reader wants to open a profile instance for a given name, the DGE looks up the hash table, finds out the engine to which it belongs and invokes the open( ) function for that engine. The engine creates an object of its Profile_Instance structure and returns a reference to it.

When the reader invokes any of the operations on the profile instance, DGA looks up the profile reference inside it and extracts the data engine reference from that. Then the DGA simply invokes the corresponding operation function for the engine.

There are some functions like Seek( ), GetAttribute( ) which are optional. DGA pre populates these functions with a default implementation, for all the Data Generation Engines, the Engine can override them if they choose to.

FIG. 1 is a block diagram illustrating a network traffic generation system according to an embodiment of the subject matter described herein. Referring to FIG. 1, network traffic generation system 100 includes a data generation adapter 102, a plurality of data generation engines 104, and a protocol emulator 106. Protocol emulator 106 may be any suitable emulator that generates network traffic. In one example, emulator 106 may be an OSI layer 7 protocol emulator. Network traffic generation system 100 may be a traffic emulator that sends traffic to a device under test 108 to test the functionality of device 108. Exemplary devices under test that may be tested include routers, switches, servers, firewalls, network address translators, or any other network communications device. Traffic generation system 100 may further include a network interface 110 for sending traffic to and receiving traffic from device under test 108. Network interface 110 may be an IP over Ethernet or other suitable network interface.

Data generation adaptor 102 simplifies access to data stored by data generation engines 104 by providing a uniform interface for protocol emulator 106 to access data, regardless of the type or format in which data is stored. All that protocol emulator 106 is required to know is the name of a data profile that is being requested. For example, if emulator 106 desires to send HTTP file data to device under test 108, emulator 106 may send a request to data generation adaptor 102 to open a data profile instance for obtaining the HTTP file data. In response to the request, data generation adaptor 102 may identify a data generation engine 104 that provides the appropriate data and create a data profile instance 112 for retrieving the HTTP file data and maintaining state about data about the number of bytes that have been sent to device under test 108. If protocol emulator 106 desires to obtain a different kind of data, such as streaming video, protocol emulator 106 sends another request to data generation adaptor 102 with the data profile name for streaming video. Data generation adaptor 102 creates a data profile instance for obtaining the streaming video and the instance obtains the data from the appropriate data generation engine.

Data generation engines 104 provide data according to the various types. Data generation engines 104 register with data generation adaptor 102 to indicate the names of the data profiles managed by each data generation engine 104. Data generation adaptor 102 uses this registration information to identify a data generation engine to provide data in response to a required from protocol emulator 106. As new data needs to be added for test purposes, a new data generation engine 104 may be added to provide the new data. The new data generation engine 104 registers with data generation adapter 104, and any protocol emulators 106 need only be configured with the data profile instance identifier to access the new data generation engine. Configuration of the emulators with the new data profile instance identifier may be performed manually, e.g., via a graphical user interface, or automatically, e.g., through a registration procedure similar to that described herein for registering with the DGA.

Figure 2:
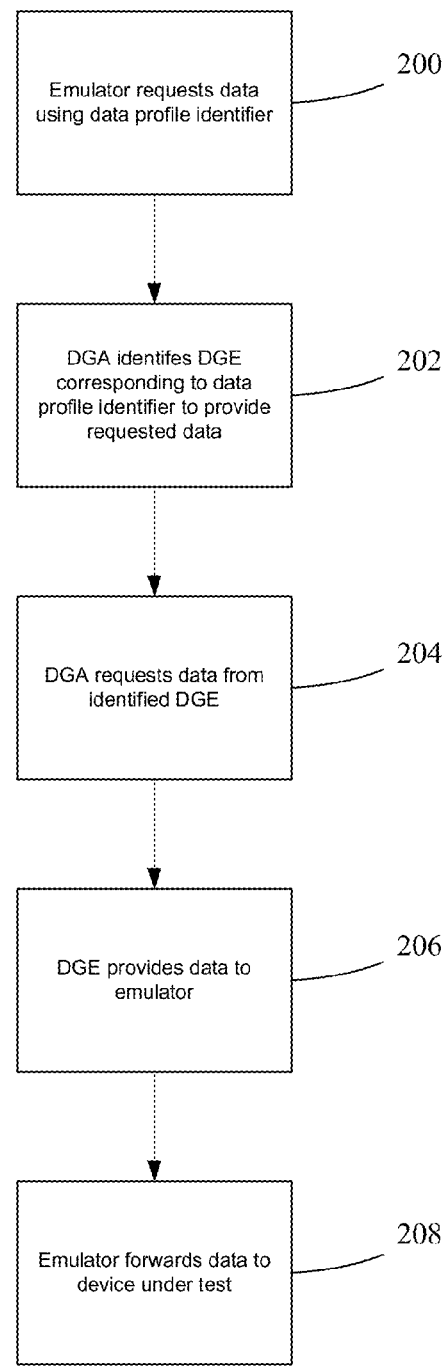
FIG. 2 is a flow chart illustrating exemplary steps of a process for providing a unified framework to support pluggable data generation engines according to an embodiment of the subject matter described herein.

FIG. 2 is a flow chart illustrating exemplary steps for providing unified access to data generation engines according to an embodiment of the subject matter described herein. Referring to FIG. 2, in step 200, the emulator requests data using a data profile identifier. For example, referring to FIG. 1, emulator 106 may request that DGA 102 create or open a data profile instance using a data profile identifier, which corresponds to data of a particular type. As stated above, in one example, emulator 106 may request HTTP file data. In step 202, DGA 102 identifies the data generation engine corresponding to the data profile identifier to provide the requested data. In FIG. 1, DGA 102 may consult registration data from data generation engines 104 to identify the appropriate data generation engine 104 to provide the HTTP file data.

In step 204, DGA 102, or more precisely, the newly-created data profile instance created by DGA 102, requests data from the DGE corresponding to the data profile identifier. In step 206, the data generation engine provides data to protocol emulator 106. Data generation engine 104 may send the data directly to emulator 106. Alternatively, data generation engine 104 may send the data to the data profile instance, which sends the data to protocol emulator 106. In step 208, emulator 106 sends the data to device under test 108. For example, the HTTP file data may be sent to a server through a firewall, where the firewall is the device under test. Advantages:

In some existing protocol emulator implementations that support different types of payloads, implement separate handlings for each payload type. This model has several drawbacks:
a) The developer has to know during the development cycle, the entire range of payload types to be supported and make provisions for them.
b) Addition of any new payload type requires some amount of recoding in each emulator module.
c) The emulator needs to maintain separate data structure to hold the configuration and context information for each payload type.

The subject matter described herein segregates the configuration and storage/generation of the payload into a separate set of modules, i.e., the DGA and the data generation engines. New payload types can be supported across all the emulators with the addition of an engine along with some changes in the GUI section of the DGA to allow the user/developer to configure the payload configuration parameters for the new type.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for testing a network communications device, the system comprising:
at least one hardware processor,
a plurality of data generation engines implemented by the at least one hardware processor for accessing and providing test data of different types, wherein the plurality of data generation engines includes a first data generation engine for providing emulated hypertext transfer protocol (HTTP) files test data and a second data generation engine for providing emulated streaming video test data;
a data generation adaptor implemented by the at least one hardware processor for providing access to the test data, including the emulated HTTP file test data and the emulated streaming video test data provided by the first and second data generation engines, using data profile identifiers, wherein the data generation engines register the data profile identifiers with the data generation adaptor to indicate names of data profiles provided by the data generation engines and wherein the data generation adapter defines a fixed set of interface structures and functions that any data generation engine needs to implement in order to become a data generation adapter compatible engine, the structures including a data generation engine structure that contains configurations and data structures that a data generation needs to perform its tasks; and
a protocol emulator implemented by the at least one hardware processor for issuing an open request to the data generation adaptor to open a data profile instance for obtaining test data from one of the data generation engines providing a desired test data type, the open request including one of the data profile identifiers, the protocol emulator further issuing a get request to the data generation adaptor, the get request specifying a name of the data profile instance and an amount of test data to be retrieved wherein the data profile instance obtains the amount and type of test data from the data generation engine corresponding to the data profile identifier and provides the test data to the protocol emulator, and wherein the protocol emulator forwards the test data to the network communications device under test.

2. The system of claim 1 wherein the data generation adaptor generates different data profile instances to retrieve test data of different types from the data generation engines.

3. The system of claim 1 wherein the data profile instance maintains state about data test data provided by the identified data generation engine.

4. A method for testing a network communications device, the method comprising:
   providing a plurality of data generation engines for accessing and providing data of different types, wherein the data generation engines include a first data generation engine for providing emulated hypertext transfer protocol (HTTP) file test data and a second data generation engine for providing emulated streaming video test data;
   providing a data generation adaptor for providing access to the test data, including the emulated HTTP file test data and the emulated streaming video test data provided by the first and second data generation engines, using data profile identifiers, wherein the data generation engines register the data profile identifiers with the data generation adaptor to indicate names of data profiles managed by the data generation engines and wherein the data generation adapter defines a fixed set of interface structures and functions that any data generation engine needs to implement in order to become a data generation adapter compatible engine, the structures including a data generation engine structure that contains configuration and data structures that a data generation needs to perform its tasks; and
   providing a protocol emulator for sending data to a device under test;
   issuing an open request from the protocol emulator to the data generation adaptor to open a data profile instance for obtaining test data from one of the data generation engines providing a desired test data type, the open request including one of the data profile identifiers, and further issuing a get request to the data generation adaptor, the get request specifying a name of the data profile instance and an amount of data to be retrieved;
   obtaining, by the data profile instance, the amount and type of test data from the data generation;
   providing, by the data profile instance, the test data to the protocol emulator; and
   forwarding, by the protocol emulator, the test data to the network communications device under test.

5. The method of claim 4 wherein the data generation adaptor generates different data profile instance for retrieve the data of different types from the data generation engines.

6. The method of claim 4 wherein the data profile instance maintains state about test data provided by the identified data generation engine.

7. The method of claim 4 comprising adding a data generation engine by registering the data generation engine with the data generation adapter and configuring the protocol emulator with a data profile instance name corresponding to the data generation engine being added.

8. A non-transitory computer readable medium having stored thereon executable instructions that when executed by the processor of a computer control the computer to perform steps comprising:
   providing a plurality of data generation engines for accessing and providing data of different types, wherein the data generation engines includes a first data generation engine for providing emulated hypertext transfer protocol ( HTTP) files test data and a second data generation engine for providing emulated streaming video test data;
   providing a data generation adaptor for providing access to the test data, including the emulated HTTP file test data and the emulated streaming video test data provided by the first and second data generation engines, using data profile identifiers, wherein the data generation engines register the data profile identifiers with the data generation adapter to indicated names of data profiles managed by the data generation engines and wherein the data generation adapter defines a fixed set of interface structures and functions that any data generation engine needs to implement in order to become a data generation adapter compatible engine, the structures including a data generation engine structure that contains configurations and data structures that a data generation needs to perform its tasks; and
   providing a protocol emulator for sending the test data to a device under test;
   sending an open request from the protocol emulator to the data generation adaptor to open a data profile instance for obtaining test data from one of the data generation engines providing a desired test data type, the open request including one of the data profile identifiers, and further issuing a get request to the data generation adaptor, the get request specifying a name of the data profile instance and an amount of data to be retrieved;
   obtaining by the data profile instance the amount and type of test data from the data generation engine corresponding to the data profile identifier,
   providing, by the data profile instance, the test data to the protocol emulator; and
   forwarding, by the protocol emulator, the test data to the network communications device under test.

* * * * *

UNITED STATES PATENT AND TRADEMARK OFFICE
CERTIFICATE OF CORRECTION

PATENT NO. : 9,652,264 B2
APPLICATION NO. : 13/670450
DATED : May 16, 2017
INVENTOR(S) : Majumdar et al.

Page 1 of 2

It is certified that error appears in the above-identified patent and that said Letters Patent is hereby corrected as shown below:

In the Claims

Column 6, Line 30:
Replace "processor,"
With --processor;--

Column 6, Line 36:
Replace "files"
With --file--

Column 6, Line 64:
Replace "retrieved"
With --retrieved,--

Column 7, Line 8:
Replace "about data"
With --about--

Column 7, Line 13:
Replace "providing"
With --providing test--

Column 7, Line 32:
Replace "configuration"
With --configurations--

Column 7, Line 34:
Replace "sending"
With --sending the test--

Signed and Sealed this
Nineteenth Day of June, 2018

Andrei Iancu
*Director of the United States Patent and Trademark Office*

CERTIFICATE OF CORRECTION (continued)
U.S. Pat. No. 9,652,264 B2

Column 7, Line 51:
Replace "instance for"
With --instances to--

Column 7, Line 52:
Replace "the data"
With --test data--

Column 8, Line 14:
Replace "data"
With --test data--

Column 8, Line 15:
Replace "includes"
With --include--

Column 8, Line 17:
Replace "( HTTP) files"
With --(HTTP) file--

Column 8, Line 26:
Replace "indicated"
With --indicate--

Column 8, Line 45:
Replace "obtaining"
With --obtaining,--

Column 8, Line 45:
Replace "instance"
With --instance,--

Column 8, Line 47:
Replace "identifier,"
With --identifier;--